United States Patent [19]
Yang

[11] Patent Number: 4,565,218
[45] Date of Patent: * Jan. 21, 1986

[54] LIQUID MIXING VALVE WITH SINGLE HANDLE

[76] Inventor: Tai-Her Yang, 5-1 Tay Pyng St., Shi Hwu Jenn, Jang Huah Shiann, Taiwan

[ * ] Notice: The portion of the term of this patent subsequent to Mar. 19, 2002 has been disclaimed.

[21] Appl. No.: 514,606

[22] Filed: Jul. 18, 1983

Related U.S. Application Data

[63] Continuation-in-part of Ser. No. 356,402, Mar. 9, 1982, Pat. No. 4,505,301.

[51] Int. Cl.$^4$ .......................................... F16K 11/087
[52] U.S. Cl. ................................. 137/625.41; 251/315
[58] Field of Search ..................... 137/625.41, 636.2; 251/315

[56] References Cited

U.S. PATENT DOCUMENTS

| | | |
|---|---|---|
| 1,614,437 | 1/1927 | Cochran . |
| 2,535,580 | 12/1950 | Kersten . |
| 2,592,062 | 4/1952 | Perry . |
| 3,130,750 | 4/1964 | Post . |
| 3,167,086 | 1/1965 | Michalski . |
| 3,422,849 | 1/1969 | Manoogian . |
| 3,472,279 | 10/1969 | Sanderson ................. 137/625.41 |
| 3,533,436 | 10/1970 | Parkison . |
| 3,796,231 | 3/1974 | Hare . |
| 3,823,742 | 7/1974 | Von Corpon . |
| 3,906,999 | 9/1975 | Manoogian et al. . |
| 4,043,359 | 8/1977 | Christo . |
| 4,226,260 | 10/1980 | Schmitt . |
| 4,352,369 | 10/1982 | Lorch . |

Primary Examiner—Arnold Rosenthal
Attorney, Agent, or Firm—Cushman, Darby & Cushman

[57] ABSTRACT

A liquid mixing valve with a single control handle and a relatively simple mechanical structure includes a handle which causes a guide body to rotate to a desired position within a spherical cavity so as to align cold and hot inlet ports communicating with the cavity with a mixing cavity defined in the guide body. Rectilinear movement of the handle regulates liquid flow rate, while rotation of the handle controls the ratio of hot to cold liquid in the mixture. An annular seal prevents liquid from escaping from the inlet ports when the valve is in an OFF position.

10 Claims, 10 Drawing Figures

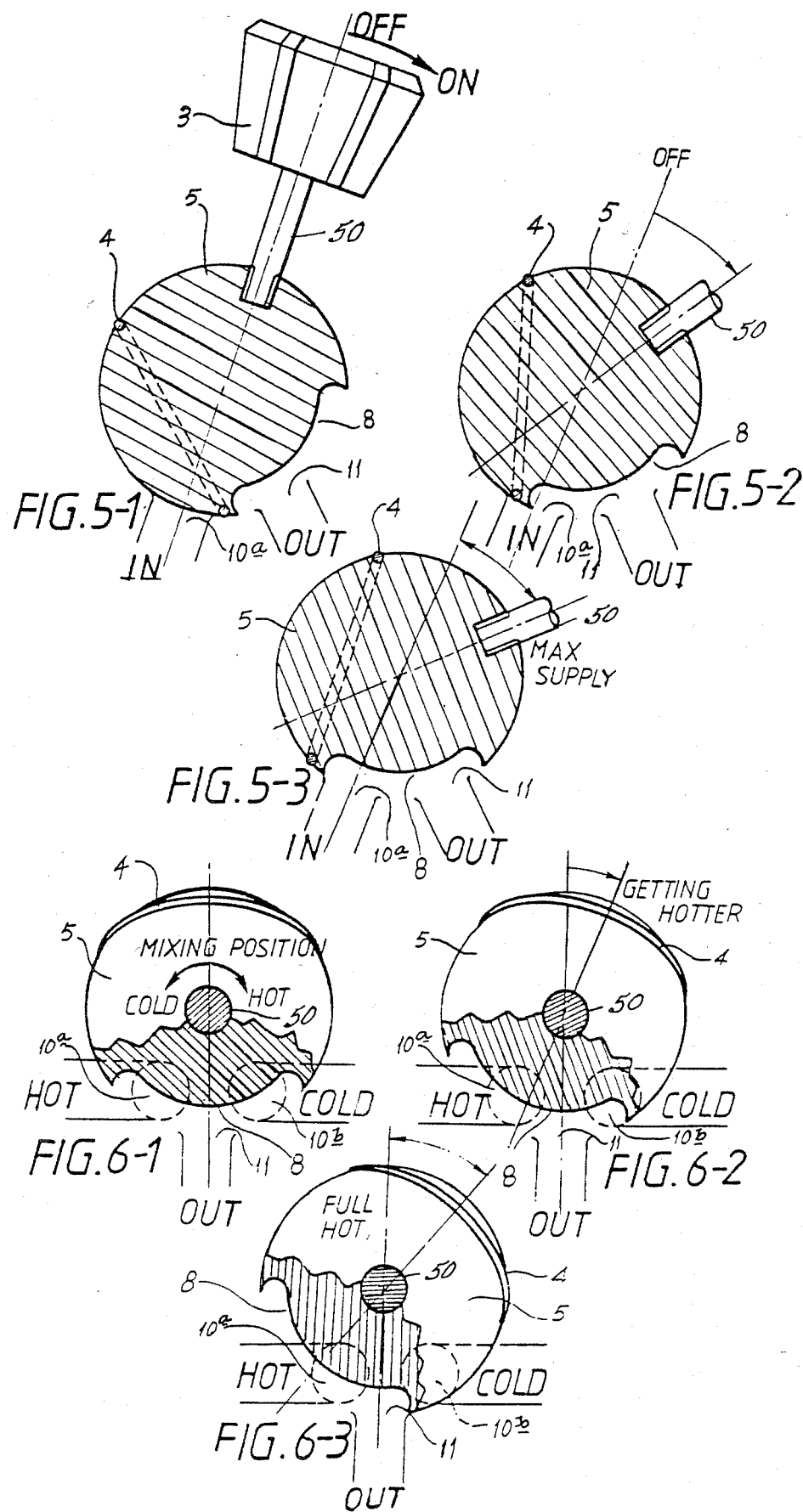

LIQUID MIXING VALVE WITH SINGLE HANDLE

CROSS-REFERENCE TO RELATED APPLICATIONS

The present application is a continuation-in-part (CIP) application of application Ser. No. 356,402 filed Mar. 9, 1982 (now issued as U.S. Pat. No. 4,505,301 on Mar. 19, 1985), in which is disclosed a valve including a single handle movable both in an x-axis and a y-axis direction for both liquid flow rate and temperature regulation.

BACKGROUND OF THE INVENTION

Liquid mixing valves which permit control of multiple flow parameters by operation of a single handle are, in general, known. The fluid mixing valve disclosed in U.S. Pat. No. 3,167,086 to Michalski (1965) includes a handle which, as a result of being movable only within a slot of an upper surface of a cover of the valve, can be moved rectilinearly (in the y-axis direction) for water temperature regulation, and # rotated for water volume regulation (or for closing or opening the valve). Since the water can only flow when a groove passage defined in a spherical valve body is aligned with an outlet passage, and since the valve body can only be displaced through a very small angle in a rotary circle, the amount of rotation available for water volume regulation is minimal. In addition, the up-and-down (y-axis) moving angle for water temperature regulation is also relatively small.

In U.S. Pat. No. 3,422,849 to Manoogian (1969) discloses a mixing valve wherein a handle stem is attached to a valve body in which is defined a recessed portion. Due to this arrangement, the water flowing through the valve must pass around a mixing groove in communication with an outlet duct before reaching the outlet duct. Consequently, the water-tight accessories (e.g., fittings) used in the disclosed device are rather complicated.

SUMMARY OF THE INVENTION

The present invention includes a spherical water guide body rotatable within a spherical cavity which includes a cold/hot water (liquid) inlet ports and a water outlet port. The volume of liquid exhausted from the outlet port may be varied by varying the total area of the hot and cold water inlet ports in registry with a mixing cavity defined in the guide body, while the temperature of the flow may be controlled by varying the converage ratio of the mixing cavity with respect to the cold/hot water inlet ports.

When a single handle attached to the guide body is moved longitudinally (i.e. rectilinearly), the water guide body causes the mixing cavity to gradually close or open the cold/hot water inlet ports for regulating the water volume output (i.e. flow rate). When the single handle is rotated, the water guide body causes the mixing cavity to selectively move into and out of registry with the cold/hot water inlet ports for regulating the temperature of water flowing from the outlet port.

The water guide body defines a ring groove in which is disposed a water choke ring. The choke ring stops the water under pressure at the inlet ports from entering into the mixing cavity when the water guide body is moved to a zero watersupply (i.e. OFF) position. When the water guide body is rotated to a predetermined position, the water choke ring encloses the cold/hot water inlet ports to completely stop all flow of liquid into the mixing cavity.

BRIEF DESCRIPTION OF THE DRAWINGS

FIGS. 5-1, 5-2, and 5-3 are side and sectional views of the embodiment shown in FIG. 1 respectively shown in three different outlet flow rate positions; and FIGS. 6-1, 6-2, and 6-3 are top and sectional views of the embodiment shown in FIG. 1 respectively shown in three different temperature regulation positions.

DETAILED DESCRIPTION OF PREFERRED EMBODIMENTS

Figure 1:
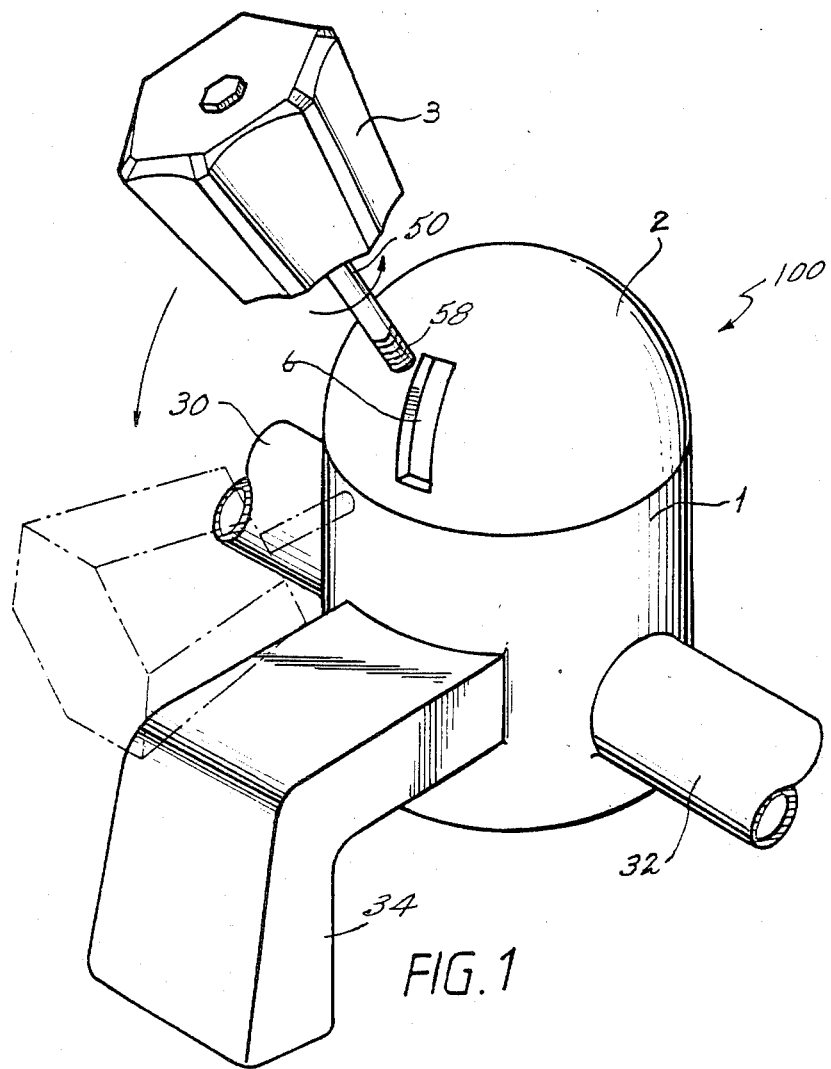
FIG. 1 is an elevated side view in perspective of the presently preferred exemplary embodiment of the present invention.
Figure 2:
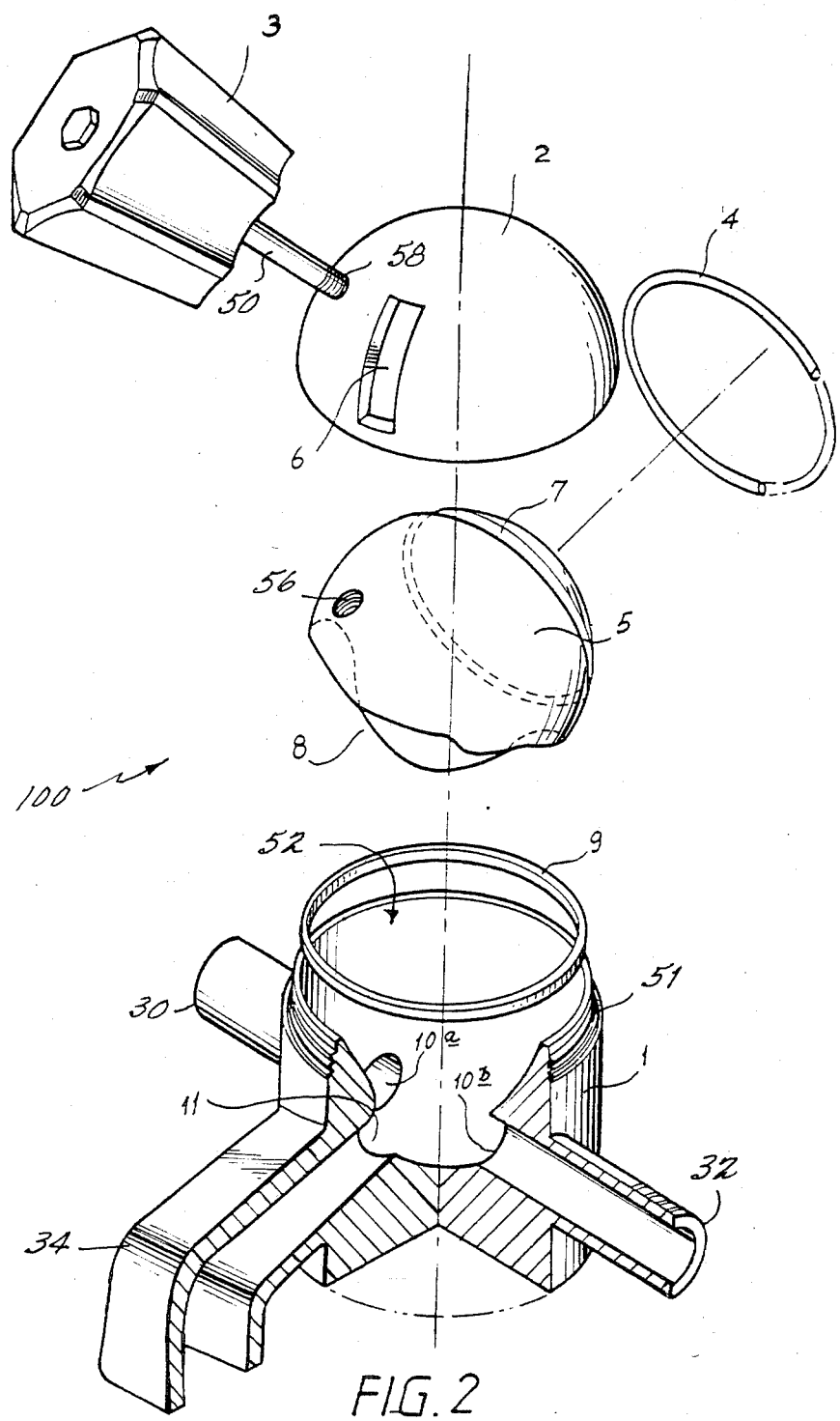
FIG. 2 is an exploded side perspective view of the embodiment of the present invention shown in FIG. 1.

FIGS. 1 and 2 respectively are perspective and exploded perspective side views of the presently preferred exemplary embodiment of a liquid mixing valve 100 in accordance with the present invention. Valve 100 of the present invention includes a base 1, an hemispherical cover 2, a handle 3, a water choke ring 4, a water guide body 5, a longitudinal aperture 6 defined in cover 2 (for volume regulation), an annular groove 7 defined in body 5 (adapted to receive water choke ring 4), a mixing cavity 8 (also defined in body 5), a collar 9, a hot water inlet pipe 30, a cold water inlet pipe 32, and a water outlet pipe (e.g. spout) 34. As is shown in FIGS. 1 and 2, the base 1 is preferably of one-piece construction and defines hot and cold water inlet pipes 30 and 32 and outlet pipe 34. In the preferred embodiment, hot water pipe 30 is connected to a source (not shown) of liquid under pressure at a first temperature, while cold water pipe 32 is connected to a source (also not shown) of liquid under pressure at a second temperature less than the first temperature.

Figure 3:
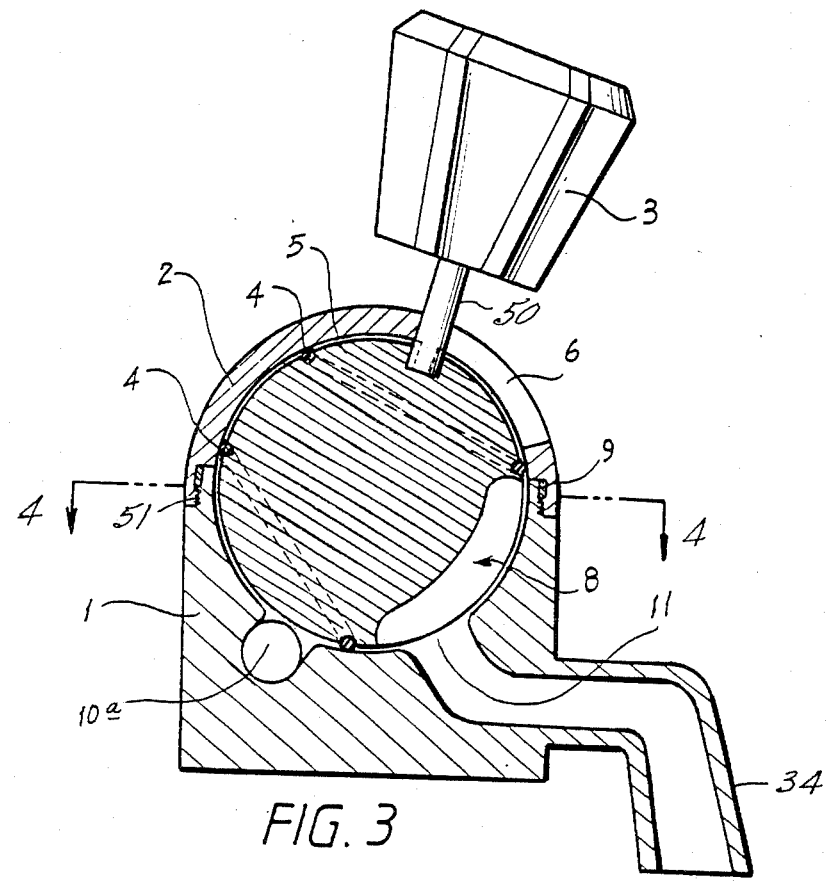
FIG. 3 is a side and sectional view of the embodiment shown in FIG. 1 positioned at a zero water-supply (i.e. OFF) position.

A spherical cavity 52 is defined in base 1. A hot water inlet port 10a is defined in the wall of base 1 which defines cavity 52 and communicates with hot water pipe 30. Similarly, a cold water inlet port 10b is defined in the wall of base 1 which defines cavity 52 and communicates with cold water pipe 32, while an outlet port 11 is defined in the wall and communicates with outlet pipe 34. In the preferred embodiment, inlet ports 10a and 10b are circular in shape and approximately equal in size (i.e. have the same cross-sectional area), while outlet port 11 is shaped as an ellipse and has a larger cross-sectional area than that of either of inlet ports 10a and 10b. Water flows into cavity 52 through inlet ports 10a and 10b, and is exhausted from the cavity through outlet port 11. Referring to FIG. 3, the water inlet ports 10a and 10b are separated from one another and are arranged abreast at one side of base 1 (i.e., they are oriented axially with respect to one another), while the water outlet port 11 is arranged at another side of the base (i.e., oriented perpendicularly to the water outlets). The hemispherical cover 2 may be closely attached to base 1 along the upper edge of the base by means of the collar 9 and threads 51 to prevent liquid from flowing out of cavity 52 except through outlet port 11. Collar 1 thus prevents water from flowing from the part of cavity 52 defined by base 1 into the part of the cavity defined by cover 2.

A longitudinal aperture 6 (for volume regulation) having a width equal to the diameter of a rod 50 of the handle 3 is defined in cover 2. Spherical cavity 52 defined in part by base 1 and in part by semi-circular cover 2 houses water guide body 5 and permits the guide body to rotate therein. A threaded aperture 56 defined in the water guide body 5 mates with a threaded end 58 of rod 50 of handle 3 and is fixedly connected therewith.

A mixing cavity 8 large enough to cover the inlet ports 10a and 10b and outlet port 11 simultaneously is defined in guide body 5 displaced a suitable angle from the position of aperature 56. The mixing cavity 8 extends for an arc or angle large enough to cover the entire area of the inlet ports 10a and 10b and the outlet port 11.

An annular (circular) water choke ring groove 7 is defined in body 5. Choke ring groove 7 is adapted to accept annular choke ring 4, which is used for watertight sealing of the water guide body 5 to the wall of base 1 defining cavity 52 (as is best shown in FIG. 2).

Figure 4:
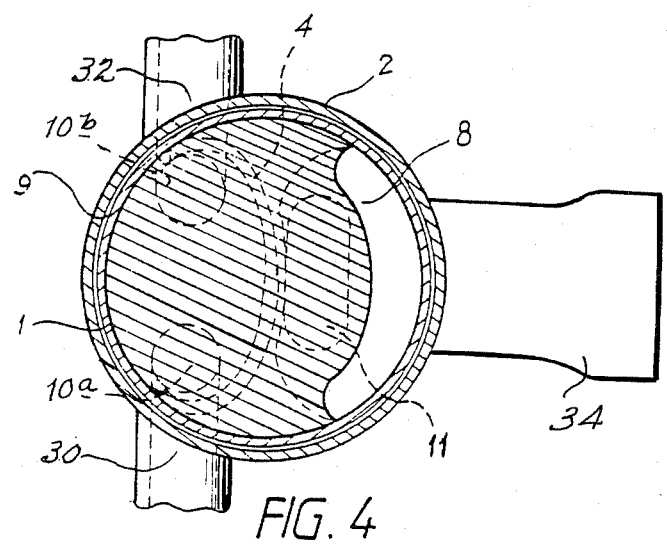
FIG. 4 is a top and sectional view of the embodiment shown in FIG. 1 positioned at a zero water-supply (i.e. OFF) position.

When valve 100 is in a closed position, water choke ring 4 surrounds the water inlet ports 10a and 10b as shown in FIGS. 3 and 4, i.e., the entire areas of the inlet ports lie within the water choke ring 4. In this position, the bottom of the water choke ring 4 does not enclose outlet port 11 as well because water guide body 5 has been moved to a maximum (top) limit longitudinally (the movement of handle 3 being limited by aperture 6 defined in cover 2). Therefore, the cold and hot water supplied through inlet ports 10a and 10b, respectively, are unable to flow past the water choke ring 4 and out through outlet port 11 as a result of the water-tight sealing between the water choke ring 4 and the inner wall of the spherical cavity 52, as shown in FIG. 3.

When handle 3 is moved (i.e. toward spout 34) longitudinally to rotate the water guide unit 5 longitudinally to a water-supplying position, water choke ring 4 slides away from the hot and cold water inlet ports 10a and 10b, while the end of the mixing cavity 8 near the water choke ring 4 moves into registry with at least one of water inlet ports 10a and 10b to guide water to flow from the inlet ports through cavity 8 to outlet port 11.

Referring to FIG. 2, handle 3 (used for changing the position of the water guide body 5) extends out of the longitudinal aperture 6 defined in the hemispherical cover 2. Handle 3 may be moved up and down at an angle ranging from 40 to 60 degrees in the preferred embodiment. At the position of maximum water-supplying the mixing cavity 8 can cover both the water inlet ports 10a and 10b and outlet port 11, as shown in FIG. 5-3. The flow volume of liquid supplied to outlet port 11 may be gradually varied from minimum to maximum by varying the areas of inlet ports 10a and 10b in registry with the mixing cavity 8, these areas changing as handle 3 is moved in a longitudinal direction to change the position of water guide body 5 (as is shown in FIGS. 5-1, 5-2, and 5-3).

Referring to FIGS. 6-1, 6-2, and 6-3, the temperature of liquid flowing through outlet port 11 is varied by rotating the water guide body 5 with the handle 3. When handle 3 is rotated about its axis clockwise, water guide body 5 together with mixing cavity 8 is rotated clockwise to cause the mixing cavity 8 to gradually cover (i.e., move into registry with) the hot water inlet port 10b and gradually close (i.e. move out of registry with) the cold water inlet port 19a. Consequently, the temperature of liquid flowing from outlet port 11 increases. When handle 3 is rotated counterclockwise, the contrary result is obtained. Because the ratio of the respective areas of the cold and hot water inlet ports 10a and 10b covered by mixing cavity 8 can be changed in a continuous manner, the temperature of water flowing from outlet 11 may be selected to be any temperature within the range of the first temperature and the second temperature.

When handle 3 is rotated clockwise or counterclockwise to one or the other extreme (as shown in FIGS. 6-1, 6-2, and 6-3), the mixing cavity 8 remains in registry with one of inlet ports 10a and 10b moving completely out of registry with the other one of the inlet ports. Hence, the water flowing out of the outlet 11 may either be 100% cold or 100% hot water. As shown in FIG. 6-3, the mixing cavity 8 can be rotated with the handle 3 to one side of the center line to vary its coverage of the hot and cold water inlet ports 10a and 10b and outlet port 11. In addition, the horizontal arc width of the mixing cavity 8 along the circumference of guide body 5 is large enough to permit the mixing cavity to cover both the cold and hot water inlet ports 10a and 10b simultaneously, while the longitudinal length of mixing cavity 8 is large enough to permit the mixing cavity to cover the cold/hot water inlet ports 10a and 10b and the water outlet port 11 all simultaneously.

Referring once again to FIG. 1, handle 3, upon being pushed longitudinally downwards (i.e., toward spout 34), causes the volume flow of liquid supplied through outlet port 11 to increase, and upon being pushed upwards longitudinally (i.e., away from spout 34), causes the volume flow to decrease. When rotating the handle 3, the cold and hot liquid mixing ratio is changed gradually from one extreme (all hot) to the other (all cold). However, the provision for control of flow rate by rectilinearly moving handle 3 and for control of temperature by rotating the handle may be reversed, i.e., longitudinal movement of the handle can be used for temperature adjustment and rotation of the handle can control flow rate.

I claim:

1. A valve for mixing a first liquid with a second liquid, comprising:
   a valve body having a wall shaped so as to define a spherical cavity therein, said wall including means for defining a first orifice therethrough for injecting a first liquid into said cavity, said wall further including means for defining a second orifice therethrough for injecting a second liquid into said cavity, said first and second liquids mixing in said cavity to form a mixture thereof, said wall further including means for defining a third orifice therethrough for discharging said mixture from said cavity;
   a spherical guide body rotatably disposed in said spherical cavity, said guide body including means for defining a mixing cavity therein selectively communicating with a variable portion of the areas said first and second orifices and with said third orifice as said guide body rotates, said guide body further including means for defining a substantially annular slot therein;
   a substantially annular seal disposed in said slot for selectively enclosing said first and second orifices to prevent liquid from escaping from said first orifice and said second orifice; and a handle, connected to said guide body, reciprocally movable along a rectilinear path and rotatable about an axis thereof, said guide body rotating in response to rotation of said handle to vary the ratio of said first and second liquids in said mixture by varying a ratio of the area of said first orifice communicating with said mixing cavity to the area of said second orifice communicating with said mixing cavity, rectilinear motion of said handle along said path rotating said guide body to change the rate said mixture discharges through said third orifice by simultaneously increasing the area of said first orifice communicating with said mixing cavity and the area of said second orifice communicating with said mixing cavity.

2. A valve as in claim 1 wherein said mixing cavity selectively simultaneously communicates with the entire cross-sectional areas of said first, second and third orifices.

3. A valve as in claim 1 wherein:
said wall further includes means for defining a slot therethrough, said handle extending through said slot, said slot defining said rectilinear path, and
said valve further includes sealing means for preventing liquid within said spherical cavity from escaping through said slot.

4. A valve as in claim 3 wherein said slot has first and second ends respectively defining limitations of rectilinear movement of said handle along said path.

5. A valve as in claim 4 wherein the length of said slot along an arc defined by a circumference of said spherical cavity is greater than the length of a diameter of at least one of said first and second orifices along said arc.

6. A valve for mixing a first liquid with a second liquid, comprising:
a valve body having a wall shaped so as to define a spherical cavity therein, said wall including means for defining a first orifice therethrough for injecting a first liquid into said cavity, said wall further including means for defining a second orifice therethrough for injecting a second liquid into said cavity, said first and second liquids mixing in said cavity to form a mixing thereof, said wall further including means for defining a third orifice therethrough for discharging said mixture from said cavity;

a spherical guide body rotatably disposed in said spherical cavity, said guide body including means for defining a mixing cavity therein selectively communicating with a variable portion of the areas of said first and second orifices and with said third orifice as said guide body rotates; and an elongated handle, connected to said guide body, reciprocally movable along a rectilinear path and rotatable about the axis thereof, said guide body rotating in response to rotation of said handle to vary the ratio of said first and second liquids in said mixture by varying a ratio of the area of said fist orifice communicating with said mixing cavity to the area of said second orifice communicating with said mixing cavity, rectilinear movement of said handle rotating said guide body to change the rate said mixture discharges through said third orifice by increasing the area of said first orifice communicating with said mixing cavity and the area of said second orifice communicating with said mixing cavity by the same amount, wherein said guide body further includes means for defining a substantially annular slot therein and further comprising a substantially annular seal disposed in said slot and positioned to prevent fluid from escaping from said first orifice and said second orifice when said handle is moved to an extreme position along said rectilinear path.

7. A valve as in claim 6 wherein said mixing cavity selectively simultaneously communicates with the entire cross sectional areas of said first, second and third orifices.

8. A valve as in claim 6 wherein:
said wall further includes means for defining a slot therethrough, said handle extending through said slot, said slot defining said rectilinear path; and
said valve further includes sealing means for preventing liquid within said spherical cavity from escaping through said slot.

9. A valve as in claim 8 wherein said slot has first and second ends respectively defining limitations of rectilinear movement of said handle along said path, said first end defining said extreme position.

10. A valve as in claim 9 wherein the length of said slot along an arc defined by said spherical cavity is greater than the length of the diameter of at least one of said first and second orifices along said arc.

* * * * *